United States Patent
Kim et al.

(10) Patent No.: US 8,395,701 B2
(45) Date of Patent: Mar. 12, 2013

(54) METHOD FOR SCALING VOLTAGE IN MOBILE TERMINAL

(75) Inventors: Jungwon Kim, Seoul (KR); Jaejin Lee, Seoul (KR); Kyu-Won Kim, Anyang-si (KR); Sung-Kwan Heo, Seoul (KR)

(73) Assignees: Samsung Electronics Co., Ltd (KR); Seoul National University R&DB Foundation (KR)

( * ) Notice: Subject to any disclaimer, the term of this patent is extended or adjusted under 35 U.S.C. 154(b) by 366 days.

(21) Appl. No.: 12/782,299

(22) Filed: May 18, 2010

(65) Prior Publication Data

US 2010/0295990 A1 Nov. 25, 2010

(30) Foreign Application Priority Data

May 22, 2009 (KR) .................. 10-2009-0045130

(51) Int. Cl.
*H04N 7/01* (2006.01)
*H04N 11/00* (2006.01)

(52) U.S. Cl. .............. 348/441; 348/730; 455/343.2

(58) Field of Classification Search .............. 348/14.01, 348/14.02, 14.12, 837, 838, 730, 192, 570, 348/441, 699–701; 455/556.1, 556.2, 343.2, 455/423, 226.2; 713/320, 322, 323
See application file for complete search history.

(56) References Cited

U.S. PATENT DOCUMENTS

| | | | |
|---|---|---|---|
| 5,742,356 A * | 4/1998 | Suzuki .................. | 348/607 |
| 7,685,446 B2 | 3/2010 | Hong et al. | |
| 8,112,640 B2 * | 2/2012 | Park et al. ............. | 713/300 |
| 2004/0119885 A1 * | 6/2004 | Hall ..................... | 348/448 |
| 2006/0087585 A1 * | 4/2006 | Seo et al. .............. | 348/385.1 |
| 2007/0186250 A1 * | 8/2007 | Carey ................... | 725/62 |
| 2008/0119242 A1 * | 5/2008 | Cho ...................... | 455/574 |
| 2008/0192622 A1 * | 8/2008 | Scheim et al. ........ | 370/210 |

FOREIGN PATENT DOCUMENTS

| | | |
|---|---|---|
| KR | 1020050107729 | 11/2005 |
| KR | 1020060104019 | 10/2006 |
| KR | 1020070079863 | 8/2007 |

* cited by examiner

*Primary Examiner* — Victor Kostak

(74) *Attorney, Agent, or Firm* — The Farrell Law Firm, P.C.

(57) ABSTRACT

Provided is an operating voltage scaling method for a portable terminal. The method includes, if reproduction of a moving image is requested, acquiring DYNamicity (DYN) of the reproduction-requested moving image, determining whether frame skipping is possible for the moving image according to the acquired DYN of the moving image, and if it is determined that frame skipping is possible for the moving image, supplying a low operating voltage to a controller of the mobile terminal to control the mobile terminal to operate with a low-speed clock, and reproducing the moving image while skipping a frame.

8 Claims, 3 Drawing Sheets

METHOD FOR SCALING VOLTAGE IN MOBILE TERMINAL

PRIORITY

This application claims priority under 35 U.S.C. §119(a) to a Korean Patent Application filed in the Korean Intellectual Property Office on May 22, 2009 and assigned Serial No. 10-2009-0045130, the contents of which are incorporated herein by reference.

BACKGROUND OF THE INVENTION

1. Field of the Invention

The present invention relates generally to a method for scaling a voltage in a mobile terminal, and more particularly, to a method in which the amount of motion, or DYNamicity (DYN), of a moving image currently being reproduced in a mobile terminal is recognized, an operating voltage is controlled or scaled according to the recognized amount of motion, and frames of the moving image are skipped during reproduction of the moving image.

2. Description of the Related Art

A battery, which generally supplies the operating power supply to a mobile terminal, is limited in its accumulated power. In consideration of portability, a mobile terminal usually employs a small-size battery. Accordingly, the saving of consumed power is vital to the battery-powered portable terminal.

Conventionally, to save power consumed in a mobile terminal, an operating voltage supplied to a controller, such as a Central Processing Unit (CPU) of the mobile terminal and an operating clock for the controller are set according to a work load by using a device such as a Power Management Integrated Circuit (PMIC).

In this case, however, a user of the mobile terminal is inconvenienced by the low-speed clock operation of the controller. For example, when a moving image is reproduced in a mobile terminal operating with a low-speed clock, the moving image may not be smoothly reproduced because a controller of the mobile terminal does not operate with a clock suitable for reproduction of the moving image.

SUMMARY OF THE INVENTION

An aspect of the present invention is to address at least the above problems and/or disadvantages and to provide at least the advantages described below. Accordingly, an aspect of the present invention is to provide a voltage scaling method for a mobile terminal in which a controller of the mobile terminal operates with a low-speed clock to save consumed power of the mobile terminal, without inconveniencing a user of the mobile terminal.

According to the present invention, there is provided a method for scaling an operating voltage. The method includes, if reproduction of a moving image is requested, acquiring DYNamicity (DYN) of the reproduction-requested moving image, determining whether frame skipping is possible for the moving image according to the acquired DYN of the moving image, and if frame skipping is possible for the moving image, supplying a low operating voltage to a controller of the mobile terminal to control the mobile terminal to operate with a low-speed clock, and reproducing the moving image while skipping a frame.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF EMBODIMENTS OF THE INVENTION

Hereinafter, embodiments of the present invention will be described in detail with reference to the accompanying drawings. Detailed descriptions of well-known functions and constructions are omitted for the sake of clarity and conciseness.

Figure 1:
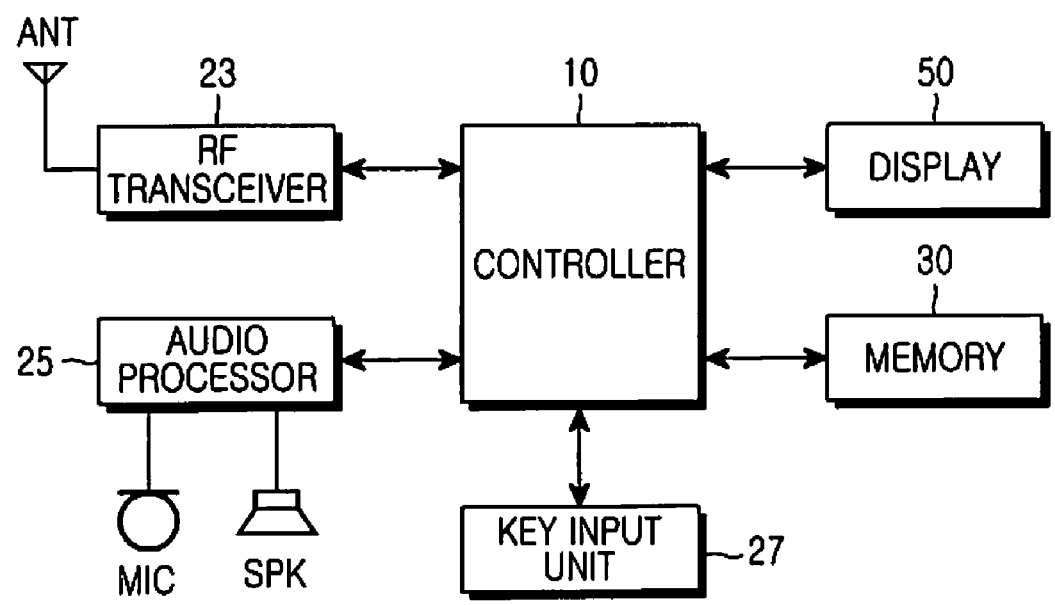
FIG. 1 illustrates a mobile terminal according to the present invention.

FIG. 1 illustrates a mobile terminal according to an embodiment of the present invention.

Referring to FIG. 1, a key input unit 27 includes keys for inputting number and character information and functional keys for setting various functions. The key input unit 27 may be used in reproducing a moving image while skipping frames, the number of which corresponds to a numeric key input by a user.

A Radio Frequency (RF) transceiver 23 performs a wireless communication function for the mobile terminal. The RF transceiver 23 includes an RF unit and a modem. The RF unit includes an RF transmitter for up-converting and amplifying a frequency of a transmission signal and an RF receiver for low-noise amplifying and down-converting a frequency of a received signal. The modem includes a transmitter for coding and modulating a transmission signal and a receiver for demodulating and decoding a signal received by the RF unit.

An audio processor 25 may be a codec, which includes a data codec and an audio codec. The data codec processes packet data and the like, and the audio codec processes audio signals such as voice and multimedia files. The audio processor 25 converts a digital audio signal received from the modem into an analog signal through the audio codec and reproduces the analog signal, or converts an analog audio signal produced from a MICrophone (MIC) into a digital audio signal through the audio codec and transmits the digital audio signal to the modem. Audio output is provided to a SPeaKer (SPK). The codec may be separately provided or included in a controller 10 of the mobile terminal. When a moving image is reproduced while skipping frames, the audio processor 25 may output the number of skipped frames or a reproduction time as audio sound.

A memory 30 includes a Read Only Memory (ROM) and a Random Access Memory (RAM). The memory 30 may include a program memory and a data memory to store programs for controlling an operation of the mobile terminal and data for booting.

A display 50 displays a video signal and user data on a screen or displays data related to performing a call. The display 50 may include Liquid Crystal Display (LCD) or Organic Light Emitting Diode (OLED). If the LCD or OLED is embodied in a touch screen, the display 50 may operate as an input unit for controlling the mobile terminal, together with the key input unit 27. The display 50 according to the present invention displays a moving image reproduced with or without frame skipping. If a moving image is reproduced with frame skipping, the display 50 according to the present invention may also display the number of skipped frames to a user as visual information before, during and/or after reproduction.

The controller 10 controls an overall operation of the mobile function. The controller 10 according to the present invention recognizes or detects the amount of motion, or DYN, of a currently reproduced moving image, controls (or scales) a supply operating voltage based on the recognized amount of motion, and reproduces the moving image while skipping a frame or frames of the moving image.

Figure 2:
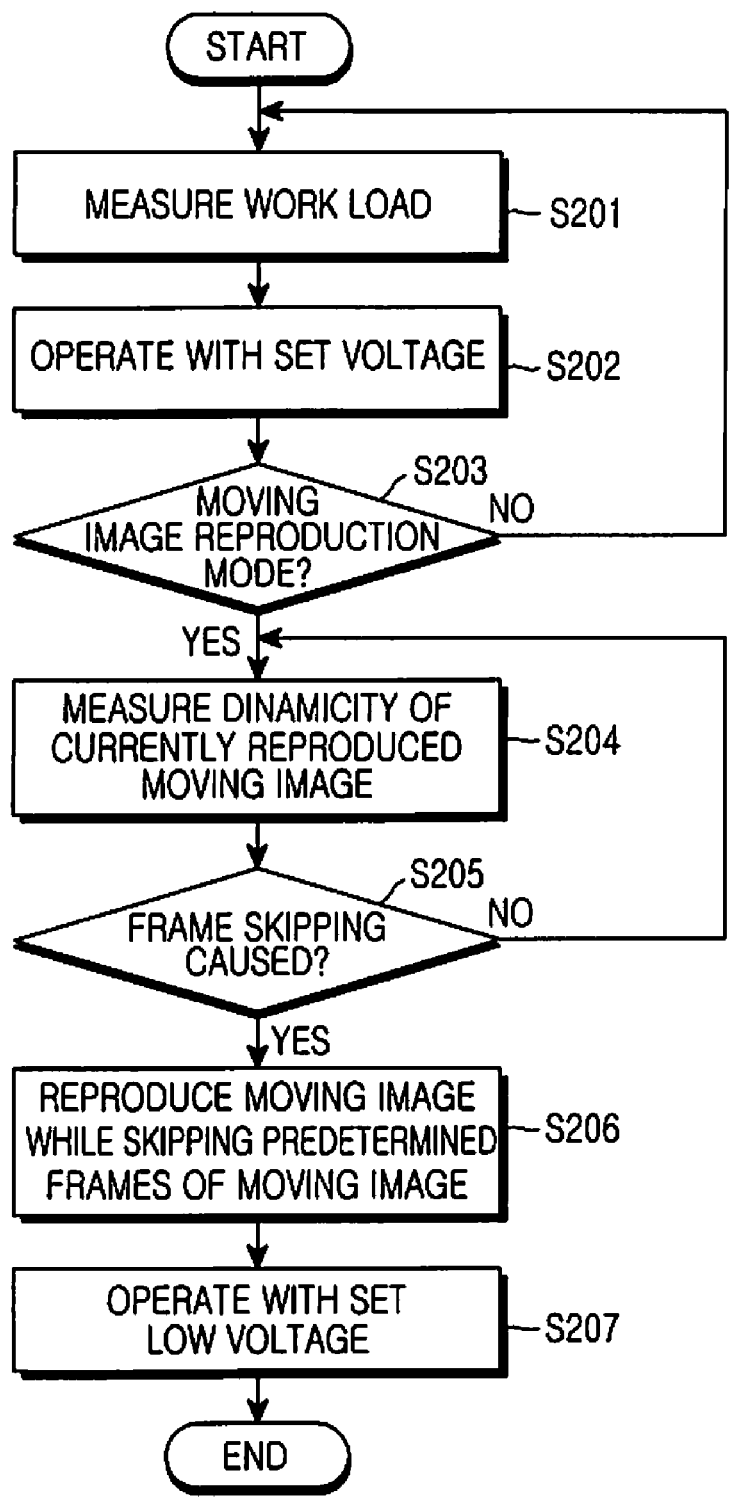
FIG. 2 illustrates a method for scaling an operating voltage according to the present invention.
Figure 3:
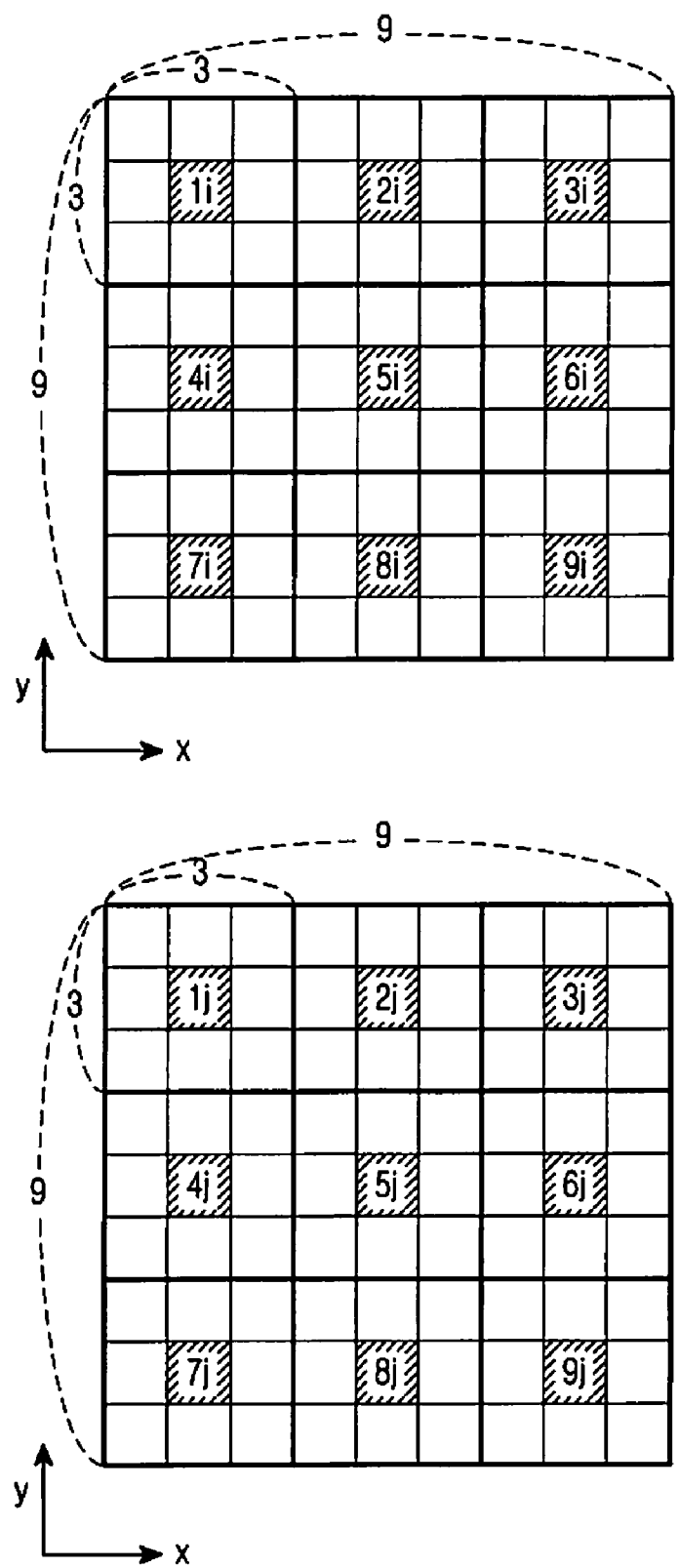
FIG. 3 is a diagram of FIG. 2.

FIG. 2 illustrates a method for scaling an operating voltage according to the present invention, and FIG. 3 is a diagram of FIG. 2.

Referring to FIGS. 2 and 3, the controller 10 measures a workload of the mobile terminal in step S201, and operates with a voltage being set according to the work load in step S202.

For example, the controller 10 determines the number of clocks necessary for performing an operation mode or the frequency of idle states to measure a workload, and operates with an operating voltage corresponding to the measured workload. It is assumed that a counter for counting clocks and a PMIC capable of controlling an operating voltage supplied to the controller 10 are included in the controller 10. It is also assumed that a reference table including workloads and operating voltages corresponding thereto is included in the controller 10 or the memory 30.

In step S203, the controller 10 determines whether the mobile terminal enters a moving image reproduction mode. If so, the controller 10 performs a control operation to measure DYN of a moving image reproduced in the moving image reproduction mode in step S204.

If it is determined that the mobile terminal enters the moving image reproduction mode, the controller 10 determines a pixel-by-pixel difference value between frames during reproduction of a moving image, in which a color space may be Red, Green, Blue (RGB) or YUV, in order to determine DYN of a moving image being reproduced. That is, the controller 10 acquires difference values between RGB channels of pixels at corresponding x and y coordinates (that is, at corresponding pixel positions) or difference values between YUV channels of pixels at corresponding x and y coordinates, in frames of a currently reproduced moving image, and uses the acquired RGB- or YUV-channel difference values as the amount of motion, or DYN, of the moving image. Although it will be described that the RGB-channel difference values are acquired to recognize the amount of motion of the moving image, the present invention may also be applied to when the color space is YUV to recognize the amount of motion of the moving image according to a modification of an embodiment.

FIG. 3 illustrates an example of acquiring difference values between RGB channels of pixels at corresponding x and y coordinates in two frames Fi and Fj among frames of a currently reproduced moving image. In the example of FIG. 3, the frames Fi and Fj each are composed of 9×9 pixels.

Difference values between RGB channels of pixels at corresponding x and y coordinates in the frames Fi and Fj of the currently reproduced moving image, which will be referred to as Pixel Difference (PD) values, are defined by Equation (1) provided below, in which R(x,y), G(x,y), and B(x,y) represent Red, Green, and Blue component values of x and y pixels. For application of Equation (1) to a YUV scheme, the YUV scheme needs to be converted into an RGB scheme through a YUV-RGB conversion function, which will be obvious to those of ordinary skill in the art.

$$PD(x,y,Fi,Fj)=|Ri(x,y)-Rj(x,y)|+|Gi(x,y)-Gj(x,y)|+|Bi(x,y)-Bj(x,y)|$$ (1)

It is desirable to acquire the PD values by applying Equation 1 to all pixels of the frames Fi and Fj, but such a process causes a large workload and therefore is not suitable for the portability-optimized mobile terminal. Since the mobile terminal has minimal power consumption as a primary performance index, acquiring PD values for all pixels of moving image frames is not appropriate because of significant increase in power consumption.

Therefore, the controller 10 according to the present invention divides each frame of a moving image into blocks of a size, i.e., n×n, and acquires PD values between frames by using only a center pixel at corresponding x and y coordinates in each of the blocks. That is, as shown in FIG. 3, the controller 10 acquires PD values between the frames Fi and Fj by applying Equation (1) to only center pixels 1$i$ to 9$i$ of 3×3 blocks produced by dividing the frame Fi and center pixels 1$j$ to 9$j$ of 3×3 blocks produced by dividing the frame Fj.

The size of each block produced by dividing a frame such as a value 'n' may be changed such that a correlation coefficient between PD values acquired by applying Equation (1) to all pixels of the frame and PD values acquired by applying Equation (1) to only a center pixel of each block is greater than a value, such as 0.9. For example, it has been proven that when each frame of a moving image is divided into 10×10 blocks and PD values are acquired by using a center pixel of each block, a correlation coefficient between PD values acquired by using only a center pixel of each block and PD values acquired by using all pixels of each frame is greater than 0.9.

The controller 10 may acquire PD values with skipping of a number of frames, instead of acquiring PD values for all frames of a moving image. For example, for a moving image having a frame rate of 30 frames per second (fps), PD values may be acquired with skipping of every other frame. Since an interval between frames is about 33 ms, the controller 10 may acquire PD values for frames having an interval of about 66 ms therebetween.

Referring back to FIG. 2, if it is determined that the measured DYN causes frame skipping in step S205, the controller 10 reproduces the currently reproduced moving image while skipping frames of the currently reproduced moving image in step S206 and controls the mobile terminal to operate with a preset low voltage in step S207.

In the present invention, the determination of whether frame skipping is caused may be performed by checking the DYN of a currently reproduced moving image, in which the DYN corresponds to an average value of the acquired PD values. For example, since the frames Fi and Fj each are divided into 9 blocks, an average value is acquired by dividing PD values acquired for the blocks 1$i$ to 9$i$ and 1$j$ to 9$j$ by the number of blocks, i.e., 9, and the acquired average value is the DYN of the moving image.

The DYN of a reproduced moving image is set to be in a range of levels 1 to 5. Therefore, the controller 10 according to the present invention is supplied with a low operating voltage to operate with a low-speed clock if the DYN is at a low level, and concurrently, reproduces a moving image while skipping many frames of the moving image. However, if the DYN is at a high level, the controller 10 lowers the frequency of reducing the supply operating voltage so that frame skipping occurs a minimal number of times.

Changing the operating voltage depending on the level of the DYN can be expressed as the following algorithm:

```
DYN = compute_dynamicity_level( );
countDYN[DYN]++;
if (DYN != 5 && countDYN[DYN] == threshold[DYN])
{
down_processor_voltage( );
countDYN[DYN] = 0;
}
```

Alternatively, a supply operating voltage may be controlled by using a Busy Clock counter Per Second (BCPS), in which the supply operating voltage is controlled according to a capacity of the controller 10 used to perform an operation mode, such as the number of clocks or frequency. For example, if the controller 10 operates at 100 MHz, a BCPS is 100M for a used capacity of 100%, and a BCPS is 50M for a used capacity of 50 percent. Controlling the operating voltage according to a used capacity can be implemented with an algorithm provided below, in which a pair of a supply operating voltage and a frequency is set to an Operation Point (OP) in a range of OP1 to OP4, and the operating voltage is controlled depending on a used capacity, such as the number of clocks or required frequency. In the following algorithm, $\delta$ is set to 0.95, considering a measured overhead and an error.

```
BCPS = compute_BCPS( );
if (BCPS > δ * frequency_of_OP3) new_OP = OP4;
else if (BCPS > δ * frequency_of_OP2) new_OP = OP3;
else if (BCPS > δ * frequency_of_OP1) new_OP = OP2;
else new_OP = OP1;
```

As is apparent from the foregoing description, in reproduction of a moving image by a mobile terminal, power consumption of the mobile terminal is reduced by lowering the speed of an operating clock of the mobile terminal, without inconveniencing a user of the mobile terminal, even when the mobile terminal operates with a low-speed clock.

While the present invention has been shown and described with reference to an embodiment thereof, it will be understood by those skilled in the art that various changes in form and details may be made therein without departing from the spirit and scope of the invention as defined by the appended claims.

What is claimed is:

1. A method for scaling an operating voltage in a mobile terminal, comprising:

if reproduction of a moving image is requested, acquiring dynamicity (DYN) of the reproduction-requested moving image;

determining whether frame skipping is possible for the moving image according to the acquired DYN of the moving image; and if frame skipping is possible for the moving image, supplying a low operating voltage to a controller of the mobile terminal to control the mobile terminal to operate with a low-speed clock, and reproducing the moving image while skipping a predetermined number of frames.

2. The method of claim 1, wherein the acquiring of the DYN comprises:

acquiring difference values between Red Green Blue (RGB) channels or YUV channels of pixels in frames forming the moving image, by comparing RGB values or YUV values of pixels at corresponding pixel positions; and acquiring the DYN of the moving image from the difference values.

3. The method of claim 1, wherein the acquiring of the DYN comprises:

dividing each of frames forming the moving image into blocks of a predetermined size, and acquiring, for center pixels of the blocks of each frame, difference values between RGB channels or YUV channels by comparing RGB values or YUV values of pixels at corresponding pixel positions; and acquiring the DYN of the moving image from the difference values.

4. The method of claim 2, wherein the acquired DYN is an average value of the difference values.

5. The method of claim 4, wherein the average value is acquired by dividing the difference values by the number of blocks produced by dividing each frame.

6. The method of claim 2, wherein frames for which the difference values between the RGB channels or the YUV channels are acquired are a predetermined number of frames among all frames forming the moving image.

7. The method of claim 1, further comprising:

supplying the operating voltage corresponding to a level of the acquired DYN to the controller; and controlling the number of skipped frames based on the operating voltage and reproducing the moving image.

8. The method of claim 3, wherein the acquired DYN is an average value of the difference values.

* * * * *